United States Patent [19]

Jörlöv

[11] Patent Number: 5,452,131
[45] Date of Patent: Sep. 19, 1995

[54] SIGHTING DEVICE FOR SMALL ARMS, COMPRISING A VARIABLE APERATURE

[75] Inventor: Richard Jörlöv, Lomma, Sweden

[73] Assignee: Sandberg Development Aktiebolag, Sweden

[21] Appl. No.: 208,362

[22] Filed: Mar. 10, 1994

[30] Foreign Application Priority Data

Mar. 10, 1993 [SE] Sweden .................. 9300782

[51] Int. Cl.⁶ ............. G02B 17/00; G02B 23/10
[52] U.S. Cl. ................... 359/638; 356/251; 356/247
[58] Field of Search ......... 356/251, 247; 33/233, 33/241; 42/103; 359/638

[56] References Cited

U.S. PATENT DOCUMENTS

| | | | |
|---|---|---|---|
| 2,887,927 | 5/1959 | Newton . | |
| 4,554,744 | 11/1985 | Huckenbeck | 33/241 |
| 4,738,044 | 4/1988 | Osterhout | 42/103 |
| 4,764,011 | 8/1988 | Goldstein | 356/251 |
| 5,189,555 | 2/1993 | Jorlov | 359/727 |
| 5,205,044 | 4/1993 | DePaoli | 33/241 |

FOREIGN PATENT DOCUMENTS

0511889A1 4/1992 European Pat. Off. .

*Primary Examiner*—Frank Gonzalez
*Assistant Examiner*—Ricky Mack
*Attorney, Agent, or Firm*—Laurence R. Brown

[57] ABSTRACT

In a sighting device for small arms comprising a holder (1) which near its one end carries a light transmitting mirror (7) and at its other end—in the focus of said mirror—a first light source (14) will according to the invention be provided with a second light source (16) both sources being mounted in front of adjacent faces on a cube beam splitter (11) in such a way that light from both sources (14, 16) coaxially follow a common path, the said light sources (14, 16) being included in circuits which are alternatively activated.

2 Claims, 1 Drawing Sheet

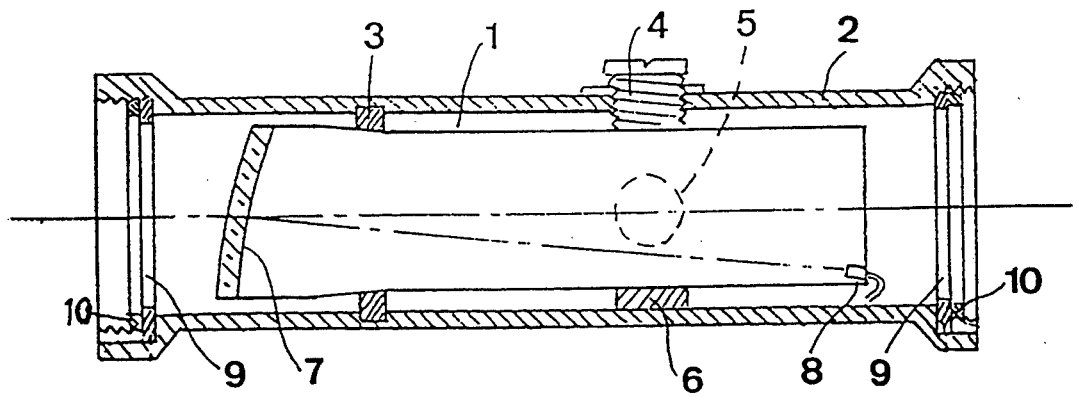
FIG 1
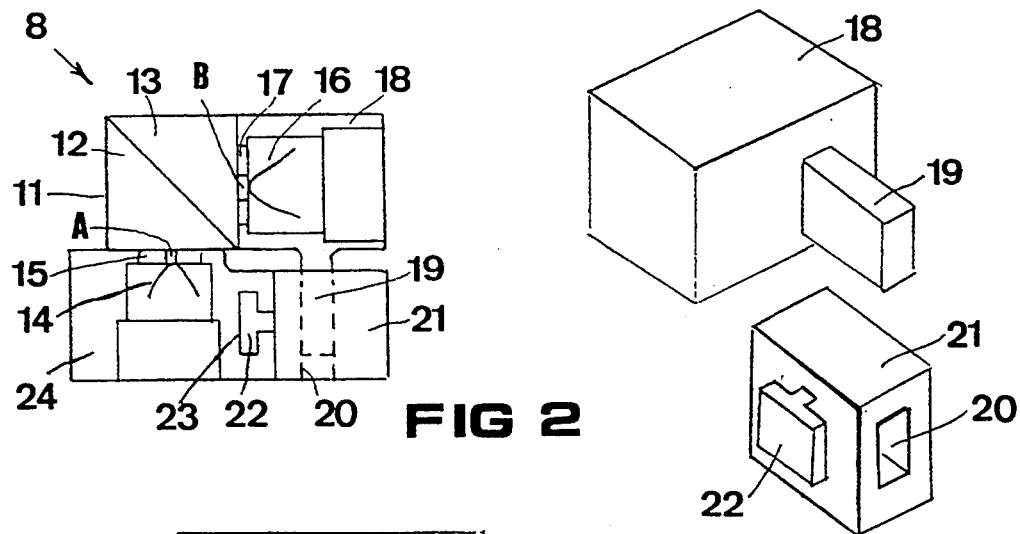
FIG 2
FIG 3
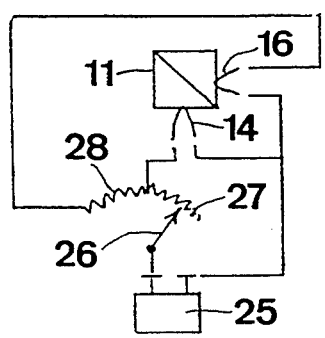
FIG 4

SIGHTING DEVICE FOR SMALL ARMS, COMPRISING A VARIABLE APERATURE

TECHNICAL FIELD

This invention relates to a sighting device for small arms comprising a holder which at one end carries a light transmitting mirror and at its other end—in the focus of said mirror—a first light emitter.

BACKGROUND ART

Looking through the holder from the end opposite the mirror the direction of the central axis of the holder will appear as a picture of the light emitter. When said picture is placed on the target the firearm has been correctly directed—provided that the sighting device has been mounted properly on the firearm.

Sighting devices of this type—often called "Red Point Devices" because of their red color light emitter—are commonly known and have a number of advantages over traditional sighting devices like e.g. open sighting devices and telescope sights, in which focusing and accommodation is necessary. This makes it possible to shoot more rapidly, both eyes may be kept open, and they facilitate the shooting for persons having weak sight.

Red Point Devices are used at many types of shooting. It may be at extremely rapid shooting at short distances, or it may be at precision shooting at longer distances.

During rapid shooting, the precision demands are often less, and therefore, a somewhat greater and more intensive aimpoint is desired, but at precision shooting the aimpoint should be small and well defined.

The intensity of the surrounding light is also of importance for deciding the intensity of the aimpoint. In dark surroundings the light emitter should be weak, whereas it should be stronger at bright sunlight in order to provide sufficient contrast against the background.

It is desired to have a choice between sighting devices mainly adapted for precision shooting and sighting devices basically for rapid handling of the firearm, i.e. different sizes of the aimpoints.

This has previously been obtained by mounting in front of the light source an aperture defining the size of the aimpoint as recognized by the eye. It has not been possible to use an aperture have variable size, because in the long run movable mechanical parts cannot stand the high acceleration stresses occurring during use of the weapon. Therefore, the problem has been solved practically by using separate sighting devices having different, constant aperture openings for different applications. Thus completely different sighting devices are needed for different types of shooting.

BRIEF DESCRIPTION OF THE DRAWINGS

Thus there is a need for a sighting device of the type referred to above in which it is possible to vary the size of the aimpoint provided by the light source without use of mechanical, movable parts, and this is according to the present invention obtained thereby, that in a sighting device of the above type said first emitter has been mounted in front of a face of a cube beam splitter, a second light source being mounted in front of an adjacent face of the same beam splitter in such a way, that light from both sources towards the mirror coaxially follows a common path, the said light sources being included in circuits in which contact members are provided for alternative activating the said light sources.

The invention will be described below in more detail reference being made to the drawing in which FIG. 1 is a longitudinal section through a sighting device according to the invention.

FIG. 2 shows a diode mounting from above.

FIG. 3 is a perspective view of adjusting means for the diode mounting.

FIG. 4 schematically shows the power supply for the diodes.

THE PREFERRED EMBODIMENT

In FIG. 1, the reference numeral 1 designates a holder embodied as an inner tube arranged in an outer tube 2. The connection is made by a rubber gland 3 arranged between the two tubes near the front end of the inner tube 1. Also, the inner tube 1 is guided relative to the outer tube 2 by two adjustment screws 4 and 5, against which the tube 1 is forced resiliently by a rubber element 6. The adjustment screws 4 and 5 are axially displaceable in directions perpendicular to each other and to the axis of the tube 2.

The tube 1 is at its front end provided with a light permeable, concave mirror 7 and in the focus of said mirror—near the rear end of the tube 1—within a holder 8 for a light source—a light emitting diode—has been mounted. Both ends of the tube 2 have been closed by protective discs of glass secured by threaded rings 10.

The above part of the device is previously known and will function as a sighting device as follows:

From the light diode holder 8, light will be emitted and reflected by the mirror 7 as parallel light beams which will give the eye of a viewer at the rear end of the tube 2 the impression that the light diode is a point at infinite distance in a visual field limited by tubes 1 and 2. The tube 2 has been rigidly connected to the firearm—e.g. to the barrel thereof—and the adjustment of the weapon is made traditionally by shooting against a target and adjusting the position of the tube 1, relative to the tube 2 by the screws 4 and 5. It is not necessary that the picture of the diode shall have any particular position in the visual field. It is sufficient that the aimpoint is on the target. The means for connecting the tube 2 to the weapon may comprise means for compensation for differences in distance.

According to the present invention, the diode holder 8 has been made in a special way shown in FIG. 2.

The diode holder, generally indicated by 8, comprises a cube beam splitter 11. It consists of two identical right-angle prisms 12 and 13, with their hypotenuse faces cemented together to form a cube. The one prism 13 has been provided with a partial reflecting film. A beam splitter of this type is sold by the US company, Mellers Griot.

A first light source 14—a light emitting diode—has been placed in front of one side of the prism 12 in the cube beam splitter 11, an aperture member 15 being used. At an adjacent side of the beam splitter 11—a side of the prism 13—a second light source 16—a light emitting diode—has been mounted using an aperture 17. As will be seen also in FIG. 3 the beam splitter 11, the second light diode 16 and the aperture 17 form parts of a first block 18 having a tongue 19 which is displaceable in a notch 20 in a second block 21. Said second block 21 is provided with a guide rail 22 displaceable in a groove 23 in a holder 24 for the first diode 14.

The diode mounting shown in FIG. 2 and 3 will function as follows:

The first diode 14 emits light through the aperture 15 having the opening A. Light will pass right through the cube beam splitter 11. The second light diode 16 will emit light through the aperture 17 having a greater opening B. The light from the diode 16 will be divided to form light passing straight forward and light being reflected 90° upwards in FIG. 2 and leaving the beam splitter 11 in the same direction as the light from the first diode 14. By relative displacement of the first block 18 and the second block 21 as well as by relative displacement of the second block 21 and the holder 24 it could be obtained that the light from both diodes will leave the beam splitter 11 coaxially. The obtained relative position may be permanented e.g. by gluing.

By selecting diodes and by adjusting the light emission of the diodes, an adaption to the intensity of the surrounding light and to the demands of the size of the aimpoint may be obtained.

This has been illustrated in FIG. 4 showing a diagram of the power supply to the diodes.

In FIG. 4 the beam splitter again has been designated by 11, the first light diode by 14 and the second light diode by 16. The circuits comprise a battery 25 and a movable rheostat contact member 26—in common for both diodes. The circuit containing the first light diode 14 is provided with a stationary rheostat contact member 27, and the circuit containing the second diode 16 has a stationary rheostat contact member 28. The last mentioned stationary contact member 28 has been arranged in continuation of the first mentioned stationary member 27. By turning the movable member 26 to the left from the position shown, the power to the first diode will increase to a maximum. Subsequently, the first diode 14 will be extinguished while the second diode 16 will be lit. It is evident that the embodiment shown may be amended so that both diodes may be energized simultaneously in parts of the regulating range. Also, it is not necessary to use a rheostat control. Controls having similar function may be used. The apertures 15 and 17 may have different shapes—or the diodes may emit different colors.

I claim:

1. A variable aperture sighting device for a small arms sight of the type producing an illuminated aiming spot with a light transmitting mirror coaxially aligning a sight line for the illuminated aiming spot along the line of sight of the variable aperture sighting device toward a sighting end in a holder for said variable aperture sighting device providing a sighting end and a target end, having a light transmitting mirror located near the target end of the holder defining a focus plane near the sighting end of the holder, said variable aperture sighting device comprising in combination, a beam splitter device for combining images produced at two faces thereof for presentation in the focus plane of said light transmitting mirror thereby to produce an aiming spot at said sighting end of the holder, two aperture members providing light transferring apertures of different shapes affixed in place at said respective two faces of the beam splitter device for passing light through either aperture member into the focus plane of said mirror, two electrically actuated light sources affixed at the respective two faces of the beam splitter device for passing light respectively through a corresponding light transferring aperture of said two aperture members , and electrical energizing means for said for two electrically actuated light sources including manually selected control means actuatable for producing light from a single one of said two electrically actuated sources, thereby for selectively establishing aiming spots of different shapes at the sighting end of the holder by producing light transmitted respectively from one of the two electrically actuated light sources through a respective said aperture member.

2. The sighting device defined in claim 1 wherein said manually selected control means further comprises a rheostat with a movable contact member movable from a position fully energizing a first one of said two electrically actuated light sources to a position fully energizing the second of said two electrically actuated light sources.

* * * * *